United States Patent
Ishigaki

(10) Patent No.: US 8,976,231 B2
(45) Date of Patent: Mar. 10, 2015

(54) DEVICE FOR MEASURING THREE DIMENSIONAL SHAPE

(75) Inventor: Hiroyuki Ishigaki, Aichi (JP)

(73) Assignee: CKD Corporation, Aichi (JP)

( * ) Notice: Subject to any disclaimer, the term of this patent is extended or adjusted under 35 U.S.C. 154(b) by 431 days.

(21) Appl. No.: 13/561,739

(22) Filed: Jul. 30, 2012

(65) Prior Publication Data

US 2013/0155191 A1 Jun. 20, 2013

(30) Foreign Application Priority Data

Dec. 15, 2011 (JP) .................................. 2011-273984

(51) Int. Cl.
*H04N 13/02* (2006.01)

(52) U.S. Cl.
USPC ............... 348/46; 348/42; 348/43; 348/49; 348/68; 348/70; 348/94; 348/135; 348/136; 348/137; 348/285; 348/370; 348/563; 348/564; 348/653; 382/154; 382/191; 356/603; 359/458

(58) Field of Classification Search
USPC ............... 348/46, 42, 43, 49, 68, 70, 94, 131, 348/136, 137, 285, 370, 563, 564, 653; 382/154, 191; 356/603; 359/458
See application file for complete search history.

(56) References Cited

U.S. PATENT DOCUMENTS

| | | | | |
|---|---|---|---|---|
| 5,841,489 | A * | 11/1998 | Yoshida et al. | 349/17 |
| 7,188,958 | B2 * | 3/2007 | Zoidis et al. | 353/119 |
| 2001/0019407 | A1 * | 9/2001 | Sato et al. | 356/237.4 |
| 2005/0111072 | A1 * | 5/2005 | Miyagaki et al. | 359/279 |
| 2008/0239419 | A1 * | 10/2008 | Tachibana et al. | 359/11 |
| 2010/0091302 | A1 * | 4/2010 | Kim | 356/603 |
| 2010/0131235 | A1 * | 5/2010 | Aoba | 702/153 |
| 2011/0017711 | A1 * | 1/2011 | Nakada et al. | 219/121.18 |
| 2011/0234758 | A1 * | 9/2011 | Tsuboi et al. | 348/46 |

FOREIGN PATENT DOCUMENTS

JP 2010276607 A 12/2010

* cited by examiner

*Primary Examiner* — Jefferey Harold
*Assistant Examiner* — Mustafizur Rahman
(74) *Attorney, Agent, or Firm* — Osha Liang LLP

(57) ABSTRACT

A device for measuring three dimensional shape includes a first irradiation unit, a first grating control unit, a second irradiation unit, a second grating control unit, an imaging unit, and an image processing unit. After performance of a first imaging operation as imaging processing of a single operation among a multiplicity of imaging operations performed by irradiation of said first light pattern of multiply varied phases, a second imaging operation is performed as imaging processing of a single operation among a multiplicity of imaging operations performed by irradiation of said second light pattern of multiply varied phases. After completion of the first imaging operation and the second imaging operation, shifting or switching operation of the first grating and the second grating is performed simultaneously.

8 Claims, 6 Drawing Sheets

DEVICE FOR MEASURING THREE DIMENSIONAL SHAPE

CROSS-REFERENCE TO RELATED APPLICATIONS

This application claims priority to Japanese Patent Application No. 2011-273984 filed on Dec. 15, 2011 in Japan.

BACKGROUND OF INVENTION

1. Field of the Invention

The present invention relates to a device for measuring three dimensional shape.

2. Background Art

Generally, when electronic components are mounted on a printed board, firstly cream solder is printed at certain positions on the electrode pattern. Thereafter, the electronic components are temporarily fixed to the printed board by use of viscosity of the cream solder. Thereafter, the aforementioned printed board is conveyed to a reflow furnace, the printed board is subjected to a certain reflow step, and soldering is performed. In recent years, inspection of the printed state of the cream solder has been required at a stage prior the printed board being conveyed to the reflow furnace. A device for measuring three dimensional shape is used during this inspection.

In recent years, there have been proposals for various types of devices for measuring three dimensional shape by the use of light (so-called contact-free devices for measuring three dimensional shape), such as technology relating to devices for measuring three dimensional shape using the phase shift method.

A device for measuring three dimensional shape using this phase shift method uses an irradiation unit composed of a light source emitting a certain light and a grating for transformation of this light from the light source to a light pattern having a sinusoidal wave pattern (stripe-shaped pattern) to irradiate the light pattern on the object to be measured (i.e., a printed board in this case). Then, a point on the board is observed using an imaging unit disposed directly above the board. A charge-coupled device ("CCD") camera or the like composed of a lens, an imaging element, or the like is used as the imaging unit. In this case, the intensity I of light at a point P on the image plane is given by the below listed formula:

$$I = e + f \times \cos\phi$$

(within the formula, e=non-modulated light noise (offset component), f=sine wave contrast (reflectivity), and $\phi$=phase imparted by roughness of the object).

Here, due to movement or switching control of the aforementioned grating, the phase is changed, for example, in 4 stages as $\phi+0$, $\phi+\pi/2$, $\phi+\pi$, and $\phi+3\pi/2$. Images of the corresponding intensity distributions (I0, I1, I2, and I3, respectively) are read, and the modulated component a is found based on the below listed formula.

$$\alpha = \arctan\{(I3-I1)/(I0-I2)\}$$

Using this modulated component, the three dimensional coordinates (X, Y, Z) of the point P on the object to be measured, such as a cream solder or the like of a printed board, are found, and these coordinates are used to measure three dimensional shape (particularly height) of the object to be measured.

However, when using only a single aforementioned irradiation unit, shadowed parts may occur where the light pattern is not irradiated on the object to be measured (measurement subject). Thus, there is concern that accurate measurement of such shadowed parts may not be possible.

In consideration of such circumstances, technology is being proposed for the performance of measurement by irradiation of light patterns from two directions in order to improve measurement accuracy or the like.

Previously in this case, while a grating of a first irradiation unit has been shifted sequentially (or switched), an entire set of image data (e.g., 4 images of image data) has been imaged within a certain measurement subject range (image range) under illumination by a first light pattern having multiply shifted phases. Thereafter, while sequentially shifting or the like a grating of a second irradiation unit, an entire single set of image data is imaged within the aforementioned measurement subject range under illumination by a second light pattern having multiply shifted phases.

In contrast, in recent years, the second light pattern from the second irradiation unit is irradiated, and imaging is performed, while the grating of the first irradiation unit is being shifted or the like, and on the other hand, the first light pattern from the first irradiation unit is irradiated and, imaging is performed, while the grating of the second irradiation unit is being shifted or the like, so that irradiation and imaging are alternatingly repeated so that the measurement time can be shortened (for example, see the proposed technology of Patent Document 1).

PRIOR ART DOCUMENTS

[Patent Document 1] Japanese Unexamined Laid-open Patent Application No. 2010-276607

However, imaging by a camera or the like is normally performed using a relatively short time interval (e.g., 2 millisecond ("msec")) under strong illumination in order to reduce the effect of mechanical vibration.

On the other hand, shifting of the grating at the irradiation unit is performed over a relatively long time interval (e.g., 20 msec) in order to avoid vibration or the like. Although a liquid crystal shutter or the like may be used as the grating, switching control of a liquid crystal shutter also requires a relatively long time interval such as that mentioned above.

Thus, according to the configuration of the aforementioned Patent Document 1, for example, assuming a total of 8 imaging operations (4 images each for each light pattern) of a certain measurement subject using two light patterns, assuming that the time interval required for a respective image is 2 msec, and assuming that the required time interval per shifting of the grating is 20 msec, then, as shown in FIG. 6, a relatively long measurement time becomes required until the completion of all processing for the certain measurement subject range (i.e., (first grating shift time interval of 20 msec+second grating shift time interval of 20 msec)×4 times=a total of 160 msec).

Furthermore, if several measurement subject ranges are set on a single printed board, then, the time interval required for measurement of this single printed board becomes severalfold longer. There is thus a need for reduction of the measurement time interval.

The aforementioned issue is not necessarily limited to the measurement of height of a cream solder or the like printed on a printed board, and the aforementioned issue is inherent to the general field of devices for measurement of three dimensional shape.

In consideration of the aforementioned circumstances, one or more embodiments of the present invention provides a device for measurement of three dimensional shape that is capable of improvement of measurement precision and reduction of the measurement time interval when performing three dimensional measurement using the phase shift method.

SUMMARY OF INVENTION

Various embodiments of the invention for addressing the above issue will be explained separately below. As may be required, the characteristic operational effects of the embodiments will also be described.

A first embodiment of the claimed invention is directed to a device for measuring three dimensional shape. The device for measuring three dimensional shape includes a first irradiation unit having a first light source for generation of a certain light, and a first grating for transforming light from the aforementioned first light source into a first light pattern having a stripe-like light intensity distribution, so that the first irradiation unit is capable of irradiating the aforementioned first light pattern from a first position upon an object to be measured. The device for measuring three dimensional shape also includes a first grating control unit configured to control shifting or switching of the aforementioned first grating and causing multiple changes of phase of the aforementioned first light pattern irradiated from the aforementioned first irradiation unit. The device for measuring three dimensional shape also includes a second irradiation unit having a second light source for generation of a certain light, and a second grating for transforming light from the aforementioned second light source into a second light pattern having a stripe-like light intensity distribution, so that the second irradiation unit is capable of irradiating the aforementioned second light pattern from a second position different from said first position upon the object to be measured. The device for measuring three dimensional shape also includes a second grating control unit configured to control shifting or switching of the aforementioned second grating and causing multiple changes of phase of the aforementioned second light pattern irradiated from the aforementioned second irradiation unit. The device for measuring three dimensional shape also includes an imaging unit configured to image reflected light from the aforementioned object to be measured irradiated by the aforementioned first light pattern and the aforementioned second light pattern. The device for measuring three dimensional shape also includes an image processing unit configured to perform three dimensional measurement by phase shift method based on multiple acquired sets of image data based on irradiation of the aforementioned first light pattern and the aforementioned second light pattern of multiply varied phases. After performance of a first imaging operation as imaging processing of a single operation among a multiplicity of imaging operations performed by irradiation of the aforementioned first light pattern of multiply varied phases, a second imaging operation is performed as imaging processing of a single operation among a multiplicity of imaging operations performed by irradiation of the aforementioned second light pattern of multiply varied phases. Further, after completion of the aforementioned first imaging operation and the aforementioned second imaging operation, shifting or switching operation of the aforementioned first grating and the aforementioned second grating is performed simultaneously.

According to the first embodiment of the claimed invention, as much as possible, due to irradiation of light patterns from two directions, it is possible to prevent the occurrence of shadowed parts where the light pattern is not irradiated on the object to be measured. Thus, accuracy of measurement may be improved.

Furthermore, the first embodiment of the claimed invention is configured so as to perform transfer or switching operation of the first grating and the second grating after conclusion of one instance of the first imaging operation of the first light pattern and performance of one instance of the second imaging operation of the second light pattern.

It is thus possible to reduce the time interval required until acquisition of all the required image data for conduction of three dimensional measurement within a certain measurement subject range.

For example, within a certain measurement subject range, assuming a total of 8 imaging operations (4 images each for each light pattern, using two light patterns), assuming that the time interval required for a single image is 2 msec, and assuming that the required time interval per shifting of the grating is 20 msec, then, the time required for the present aspect until completion of all processing within the certain measurement subject range becomes 96 msec (i.e., (first light pattern irradiation time of 20 msec+second light pattern irradiation time of 20 msec)×4 times=a total of 96 msec). That is, it becomes possible to reduce the time by 64 msec (40%) in comparison to the configuration of the aforementioned Patent Document 1 that separately performs shifting or the like of the first grating and the second grating. As a result, it becomes possible to realize more accurate measurement over a shorter time interval by use of the present aspect.

According to the configuration of the aforementioned Patent Document 1, during shifting or the like of the grating by one of the irradiation units, the light pattern from the other irradiation unit is irradiated, and imaging is performed. Thus, measurement error or the like may occur due to the effect of mechanical vibration during shifting of the grating by an actuator or the like, or due to the effect of electronic noise generated during switching control of the liquid crystal shutter or the like composing the grating.

In contrast, according to the first embodiment of the claimed invention, shifting or switching of the first grading and second grating are not performed during the first imaging process or second imaging process. Thus, control is possible without the occurrence of the aforementioned problems. As a result, it is possible to further improve accuracy of measurement.

A second embodiment of the claimed invention is directed to a device for measuring three dimensional shape. The device for measurement three dimensional shape includes a first irradiation unit having a first light source for generation of a light having a first wavelength component, and a first grating for transforming light from the aforementioned first light source into a first light pattern having a stripe-like light intensity distribution, so that the first irradiation unit is capable of irradiating the aforementioned first light pattern from a first position upon an object to be measured. The device for measuring three dimensional shape also includes a first grating control unit configured to control shifting or switching of the aforementioned first grating and causing multiple changes of phase of the aforementioned first light pattern irradiated from the aforementioned first irradiation unit. The device for measuring three dimensional shape also includes a second irradiation unit having a second light source for generation of a light having a second wavelength component differing from the aforementioned first wavelength component, and a second grating for transforming light from the aforementioned second light source into a second light pattern having a stripe-like light intensity distribution, so that the second irradiation unit is capable of irradiating the aforementioned second light pattern from a second position, differing from the aforementioned first position, upon the object to be measured. The device for measuring three dimensional shape also includes a second grating control unit configured to control shifting or switching of the aforementioned second grating and causing multiple changes of phase of the aforementioned second light pattern irradiated from the aforementioned second irradiation unit. The device for measuring three dimensional shape also includes an imaging unit configured to image separately, for each light component, reflected light from the aforementioned object to be measured irradiated by the aforementioned first light pattern and the aforementioned second light pattern. The device for measuring three dimensional shape also includes an image processing unit configured to perform three dimensional measurement by phase shift method based on multiple acquired sets of image data based on irradiation of the aforementioned first light pattern and the aforementioned second light pattern of multiply varied phases. Simultaneous with performance of a first imaging operation as imaging processing of a single operation among a multiplicity of imaging operations performed by irradiation of the aforementioned first light pattern of multiply varied phases, a second imaging operation is performed as imaging processing of a single operation among a multiplicity of imaging operations performed by irradiation of the aforementioned second light pattern of multiply varied phases. Further, after completion of the aforementioned first imaging operation and the aforementioned second imaging operation, shifting or switching operation of the aforementioned first grating and the aforementioned second grating is performed simultaneously.

The second embodiment of the claimed invention has the same effects as those of the firs embodiment. Additionally, the second embodiment results in a configuration that simultaneously irradiates multiple light patterns having mutually different wavelength components and makes possible the use of reflected light from the object to be measured irradiated by such multiple light patterns for separate imaging for each respective light component. As a result, the first imaging operation and the second imaging operation can be performed simultaneously, and it is possible to further shorten the measurement time interval.

For example, within a certain measurement subject range, assuming a total of 8 imaging operations (4 images each for each light pattern, using two light patterns), assuming that the time interval required for a single image is 2 msec, and assuming that the required time interval per shifting of the grating is 20 msec, then, the time required for the present aspect until completion of all processing within the certain measurement subject range becomes 72 msec (i.e., (first light pattern and second light pattern irradiation time of 2 msec+shifting time of the first grating and second grating of 20 msec)×4 times=a total of 88 msec). That is, it becomes possible to reduce the time by 72 msec (45%) in comparison to the configuration of the aforementioned Patent Document 1 that separately performs shifting or the like of the first grating and the second grating.

As a result, it becomes possible to realize more accurate measurement over a shorter time interval by use of the present aspect.

A third embodiment of the claimed invention is directed to the device for measuring three dimensional shape according to the first or second embodiment of the claimed invention, where positional relationship between the aforementioned imaging unit and the aforementioned object to be measured is fixed at least during performance of each of the aforementioned imaging operations.

According to the third embodiment of the claimed invention, during imaging, there is no change of the positional relationship between the imaging unit and the object to be measured. It is thus possible to prevent narrowing of the measurement subject range. As a result, it is possible to shorten the time interval required for measurement of an entire object to be measured, such as a printed board or the like, for which multiple measurement subject ranges have been set.

A fourth embodiment of the claimed invention is directed to the device for measuring three dimensional shape according to any one of the first, second, and third embodiments of the claimed invention; where the aforementioned first light pattern is produced as a light pattern of a first period, and the aforementioned second light pattern is produced as a light pattern of a second period different from the aforementioned first period.

The fourth embodiment of the claimed invention makes possible the realization of two effects, i.e., the possibility of increasing the height range capable of measurement (an advantage of use of a light pattern having a long pitch (e.g., the second light pattern)), and the possibility of measurement with higher precision (an advantage of use of a light pattern having a short pitch (e.g., the first light pattern)). As a result, high resolution measurement may be performed over a high dynamic range, and it is possible to realize measurement of higher precision.

Other aspects and advantages of the invention will be apparent from the following description and the appended claims.

DETAILED DESCRIPTION

One or more embodiments of the claimed invention will be explained below while referring to figures.

Figure 1:
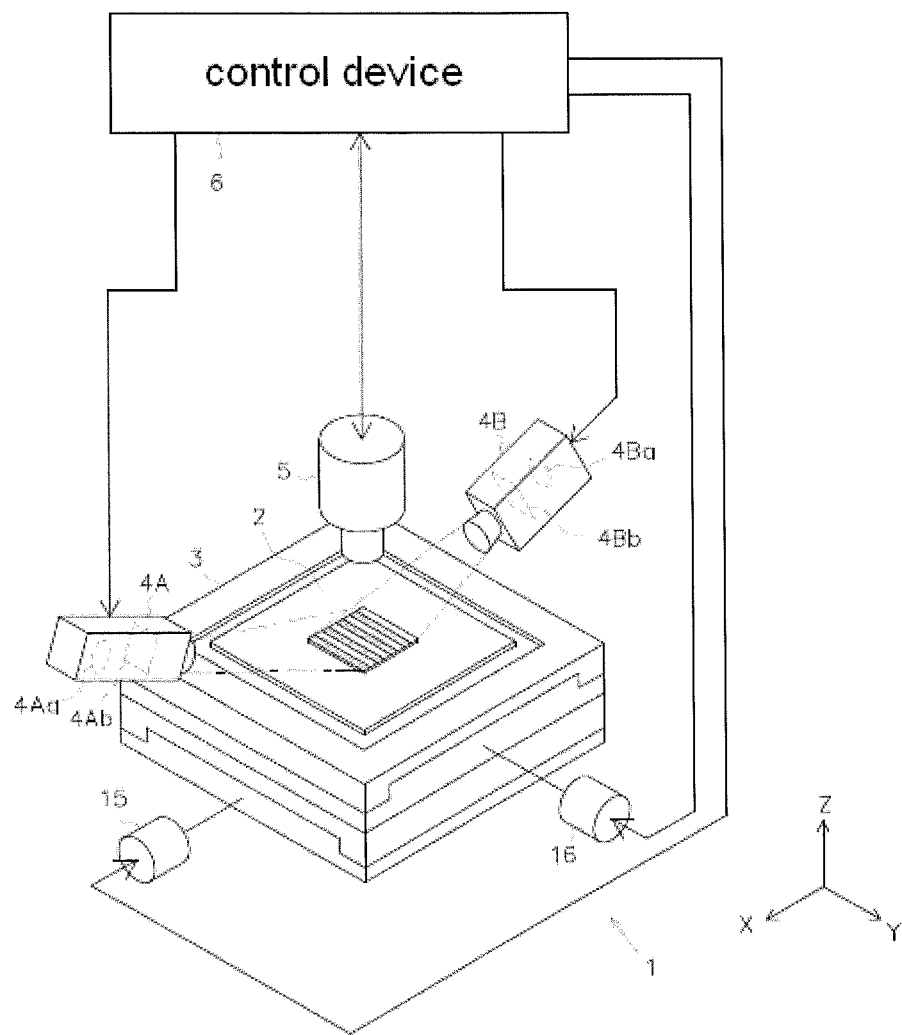
FIG. 1 is a schematic tilted-perspective view showing a board inspection device according to one or more embodiments of the present invention.

FIG. 1 is a rough structural drawing showing schematically a board inspection device 1 equipped with the device for measuring three dimensional shape of the present embodiment. As shown in this figure, the board inspection apparatus 1 is equipped with a carrying stage 3 for carrying a printed board 2 as an object to be measured produced by printing cream solder as the measurement subject, two irradiation devices (i.e., first irradiation device 4A as the first irradiation unit, and second irradiation device 4B as the second irradiation unit) for irradiation of a certain light pattern from above at a tilted angle upon the surface of the printed board 2, a camera 5 as an imaging unit for imaging the irradiated part of the printed board 2, and a control device 6 for execution of various types of control within the board inspection apparatus 1 and for image processing and calculation processing. The control device 6 comprises the image processing unit in the present embodiment.

The first irradiation device 4A is provided with a first light source 4Aa for generation of a certain light and a first liquid crystal shutter 4Ab for forming a first grating for conversion of the aforementioned light from the first light source 4Aa into a first light pattern that has a striped light intensity distribution. The striped first light pattern of a phase that changes in increments of ¼ pitch can be irradiated from above toward the printed board 2. Here, the mechanism that performs switching control of the grating state of the liquid crystal shutter 4Ab corresponds to the first grating control unit.

Similarly, the second irradiation device 4B is provided with a second light source 4Ba for generation of a certain light and a second liquid crystal shutter 4Bb for fanning a second grating for conversion of the aforementioned light from the second light source 4Ba into a second light pattern that has a striped light intensity distribution. The striped second light pattern of a phase that changes in increments of ¼ pitch can be irradiated from above toward the printed board 2. Here, the mechanism that performs switching control of the grating state of the liquid crystal shutter 4Bb corresponds to the second grating control unit.

More specifically, each irradiation device 4A and 4B has a pair of light collection lenses to which light generated by the light source 4Aa or 4Ba is conducted for producing parallel light. This parallel light passes through the liquid crystal shutter 4Ab or 4Bb and is conducted to a projection lens. Then, the striped light pattern is irradiated from the projection lens onto the printed board 2. By use of the liquid crystal shutter 4Ab or 4Bb of the respective irradiation device 4A or 4Bb, a striped light pattern may be produced that has a light intensity approaching that of the ideal sine wave. Thus, measurement resolution of three dimensional measurement improves. Moreover, phase shift control of the light pattern may be performed electronically, and the control system may be made compact.

Moreover, each of the irradiation devices 4A and 4B is set so as to irradiate each light pattern along the x-axis direction parallel to a pair of sides of the rectangular shaped printed board 2. That is, the stripes of the light pattern are irradiated orthogonally to the x-axis direction, i.e., parallel to the y-axis direction.

Moreover, the irradiation devices 4A and 4B are disposed at opposing positions so as to sandwich the printed board 2 therebetween in a planar view (x-y plane) as seen by looking in the imaging direction of the camera 5 (i.e., approximately vertical direction, z-axis direction). The position of placement of the first irradiation device 4A corresponds to the first position of the present embodiment, and the position of placement of the second irradiation device 4B corresponds to the second position.

Motors 15 and 16 are provided for the carrying stage 3. The printed board 2 carried on the carrying stage 3 is slid in an arbitrary direction (x-axis direction and y-axis direction) according to drive control by the control device 6.

The camera 5 is composed of a lens, an imaging element, and the like. A complementary metal-oxide-semiconductor ("CMOS") sensor is used as the imaging element. Of course the imaging element is not limited to this type of imaging element, and for example, a CCD sensor the like imaging element may be adopted.

Figure 2:
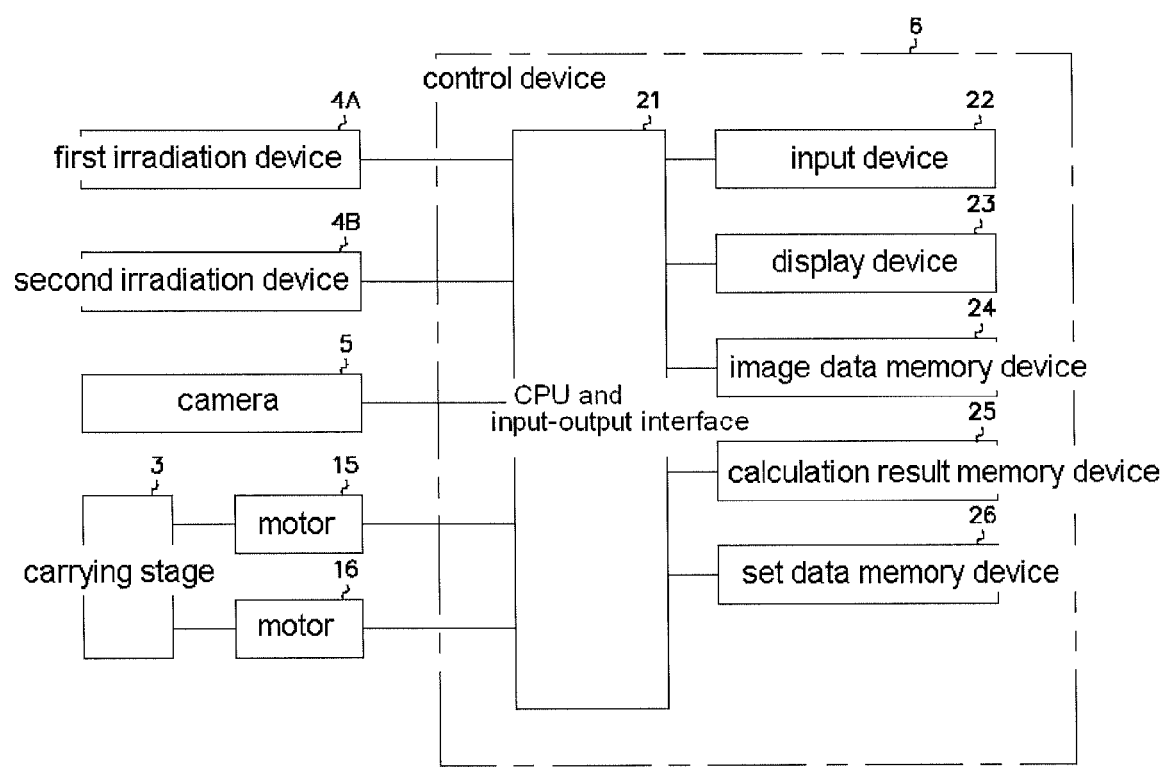
FIG. 2 is a block diagram showing the electrical configuration of the board inspection device.

The electronic configuration of the control device 6 will be explained next. As shown in FIG. 2, the control device 6 is equipped with: a central processing unit ("CPU") and input-output interface 21 for performing overall control of the board inspection apparatus 1; an input device 22 as an input unit composed of a keyboard, mouse, or touch panel; a display device 23 as a display unit that has a CRT, liquid crystal display, or the like display screen; an image data memory device 24 for memory of image data or the like based on imaging by the camera 5; a calculation result memory device 25 for memory of each type of calculation result; and a set data memory device 26 for storing various types of information beforehand. Furthermore, each of these devices 22 through 26 communicates electrically with the CPU and the input-output interface 21.

Figure 3:
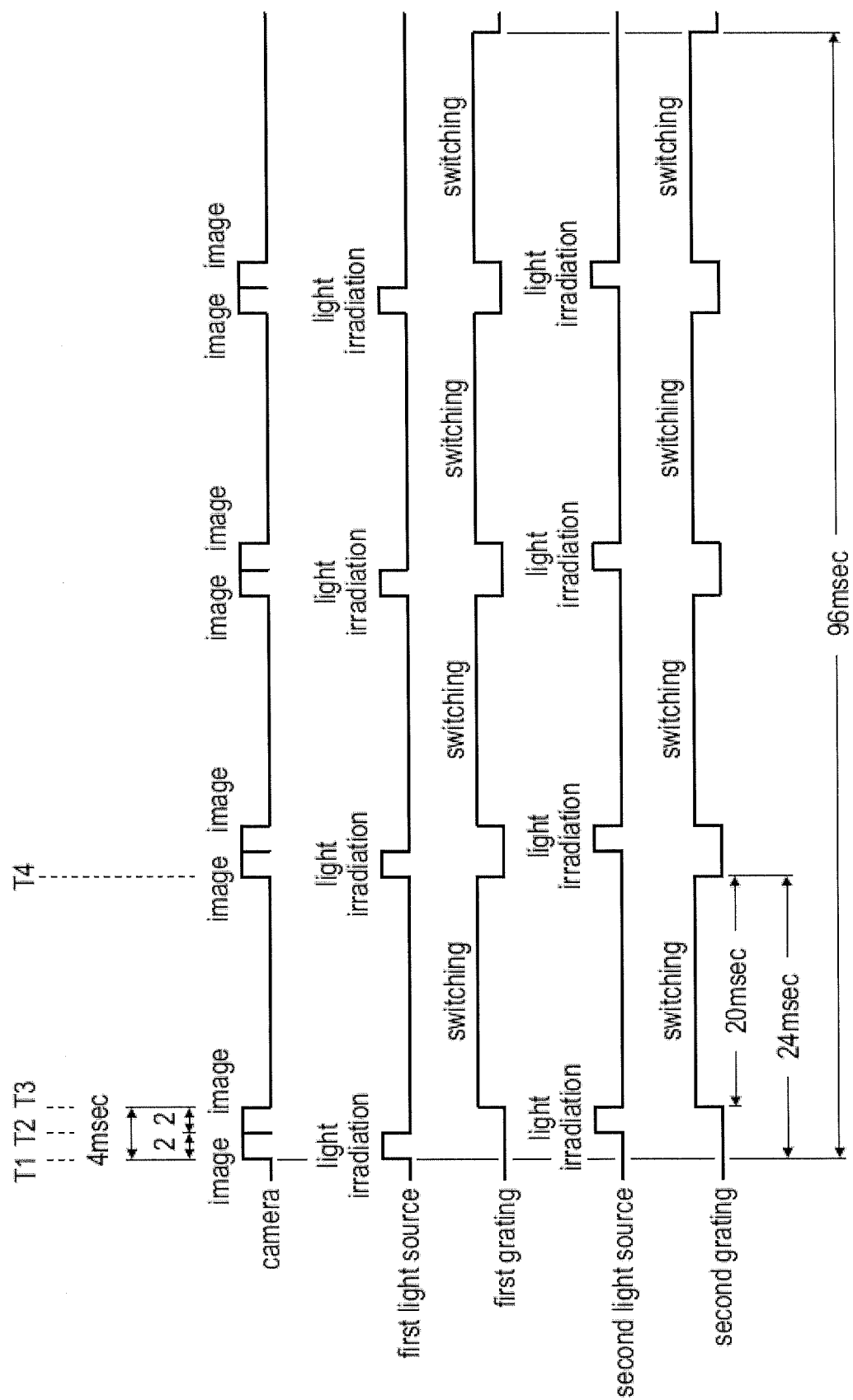
FIG. 3 is a timing chart for explanation of an operating process of a camera and irradiation device according to one or more embodiments of the present invention.

The procedure of three dimensional measurement processing executed by the control device 6 will be explained below in detail while referring to the timing chart of FIG. 3.

The control device 6 performs drive control of the motors 15 and 16 to cause movement of the printed board 2 so as to align a certain inspection area (measurement subject range) on the printed board 2 with the field of the camera 5. Surface of the printed board 2 is sub-divided beforehand into areas, each of a unit size that is the same as the size of the field of view of the CCD camera 5, and the inspection area is one area within the sub-divided surface area of the printed board 1.

Accordingly, the control device 6 performs switching control of the liquid crystal shutters 4Ab and 4Bb of both irradiation devices 4A and 4B, and the positions of the first grating and the second grating formed by these liquid crystal shutters 4Ab and 4Bb are set to certain standard positions.

When switching setting of the first grating and the second grating is complete, the control device 6 starts the no. 1 imaging operation at a certain time T1. Specifically, the first light source 4Aa of the first irradiation device 4A is made to irradiate light to start irradiation of the first light pattern, the camera 5 is controlled and driven, and imaging begins of the inspection area part irradiated by this first light pattern.

Then, after a certain time interval (2 msec in the present embodiment) has passed since the start of imaging, the control device 6 stops the no. 1 imaging operation at a time T2. That is, in addition to stopping irradiation of the first light pattern, the no. 1 imaging operation using this first light pattern is ended. The image data imaged by the camera 5 are sent to the image data memory device 24 and are stored.

Thereafter, the control device 6 starts the no. 2 imaging operation at a time T2 simultaneous with completion of the aforementioned no. 1 imaging operation. Specifically, the second light source 4Ba of the second irradiation device 4B is made to irradiate light to start irradiation of the second light pattern, the camera 5 is controlled and driven, and imaging begins of the inspection area part irradiated by this second light pattern.

Then, after a certain time interval (2 msec in the present embodiment) has passed since the start of imaging, the control device 6 stops the no. 2 imaging operation at a time T3. That is, in addition to stopping irradiation of the second light pattern, the no. 2 imaging operation using this second light pattern is ended.

Thereafter, the control device 6 starts switching of the liquid crystal shutters 4Ab and 4Bb of the irradiation devices 4A and 4B at a time T3 simultaneous with completion of the aforementioned no. 2 imaging operation. Specifically, the positions of the first grating and the second grating formed by the liquid crystal shutters 4Ab and 4Bb are switched and shifted from their respective standard position by a ¼th pitch increment ($\pi/2$) of phase for each light pattern to a respective second position.

Then, after a certain time interval (20 msec in the present embodiment) has passed since the start of the aforementioned switch processing, this switch processing stops at a time T4.

When this switch processing ends, at a time T4, the control device 6 again begins processing similarly to the aforementioned processing at the time T1. That is, the control device 6 starts the second no. 1 imaging operation using the first light pattern that has been shifted by ¼ pitch from the position at the time of the aforementioned first no. 1 imaging operation. Thereafter, processing similar to that at the aforementioned times T1 to T4 is repeated multiple times.

By repeating the aforementioned series of operations 4 times in this manner, all image data required for performance of three dimensional measurement (i.e., image data as 4 images each, a total of 8 images) of the certain inspection area may be acquired.

Then, based on 4 sets of image data acquired based on the light pattern irradiations using 4 phase shifts, the control device 6 performs height measurement (three dimensional measurement) based on the widely known phase shift method mentioned above in the description of related art.

The measurement data for each of the inspection areas obtained in this manner are stored by the calculation result memory device 25 of the control device 6. Then, based on the such measurement data for each of the inspection areas, the printing range of cream solder that became higher than the standard surface is detected, and based on integration of height at each position within this range, the volume of the printed cream solder is calculated. Then, a determination is made by comparison of standard data stored beforehand in the set data memory device 26 with data such as position, surface area, height, amount, or the like of the cream solder determined in this manner A pass-fail determination is made of the printed state of the cream solder in this inspection area based on whether or not this comparison determination is within a permissible range.

During performance of this processing, the control device controls and drives the motors 15 and 16, causes movement of the printed board 2 to the next inspection area, and thereafter repeats the aforementioned series of processing for all inspection areas.

Due to the present embodiment in the aforementioned manner, by irradiation of the light pattern from 2 directions, the occurrence of shadowed parts, where the light pattern is not irradiated on the printed board 2, may be prevented as much as possible.

As a result, measurement accuracy may be improved.

After performance of the first no. 1 imaging operation using the first light pattern during the present embodiment, the first no. 2 imaging operation is performed using the second light pattern. After conclusion of this processing, the switching of the first grating and second grating is performed simultaneously.

During inspection of the certain inspection area by this means, the time interval required until acquisition of all the image data required for performance of three dimensional measurement may be reduced, and it becomes possible to attain higher accuracy measurement during a shorter time interval.

For example, the time required until completion of all processing for a certain inspection area during the present embodiment becomes a total of 96 msec (equal to (time required for the no. 1 imaging operation (2 msec)+time required for the no. 2 imaging operation (2 msec)+time required for switching of the first grating and second grating (20 msec))×4).

Moreover, if a configuration had been adopted in which, while one of the liquid crystal shutters 4Ab or 4Bb of the irradiation device 4A or 4B is controlled and switches, the light pattern from the other irradiation device 4A or 4B is irradiated and imaged, then, measurement error or the like may occur due to the effect of electronic noise that may be generated during switching control of the liquid crystal shutter 4Ab or 4Bb.

In contrast, according to the present embodiment, switching is not performed for either of the liquid crystal shutters 4Ab and 4Bb during the no. 1 imaging operation or no. 2 imaging operation. Therefore, control is possible without the occurrence of the aforementioned problem. As a result, accuracy of measurement may be further improved.

Furthermore, movement of the printed board 2 is halted at least during the time interval during which data is acquired for the certain inspection area (i.e., during the time interval of each of the aforementioned imaging operation), and the positional relationship between the camera 5 and the printed board 2 is fixed. That is, since the positional relationship between the camera 5 and the printed board 2 during imaging does not change, it is possible to prevent narrowing or the like of the inspection area. As a result, the measurement time interval may be shortened for measurement of a printed board 2 that has multiple set inspection areas as in the present embodiment.

Moreover, the described details of the aforementioned embodiment are not limiting, and for example, the following modifications may be used. Of course, the below described embodiments are illustrative. Of course, other modified examples and example applications are possible.

(a) The board inspection device 1 of the aforementioned embodiment uses a device for measurement of three dimensional shape to measure height of the cream solder formed by printing on a printed board 2. However, this embodiment is not limiting, and a configuration may be used that measures height of a different object such as a solder bump printed on a board, an electronic component mounted on a board, or the like.

(b) The phase shift method of the aforementioned embodiment is configured for causing ¼th pitch increment changes of the phase of the light pattern. However, this configuration is not limiting, and a configuration may be adopted that varies phase of the light pattern in increments of ⅓rd pitch.

(c) According to the aforementioned embodiment, the gratings for conversion of the light from the light source 4Aa and 4Ba into striped light patterns were formed using the liquid crystal shutters 4Ab and 4Bb, and phase shifting of the light pattern was caused by switching control of these liquid crystal shutters 4Ab and 4Bb. However, this configuration is not limiting, and a configuration may be adopted, for example, that causes phase shifting of the light pattern by shifting of a grating component by a shifting unit such as a piezoelectric actuator or the like.

(d) According to the aforementioned embodiment, although nothing in particular was said about the wavelength of the light sources 4Aa and 4Ba, a configuration may be adopted in which the wavelengths of the light source 4Aa and 4Ba are different from one another. For example, a light source emitting light having a first wavelength component (red colored component) may be adopted as the first light source 4Aa, and a light source emitting light having a second wavelength component (green colored component) may be adopted as the second light source 4Ba.

In this case, by providing as the camera 5 a camera that is capable of separate imaging according to each light component the reflected light from the printed board 2 irradiated by the first light pattern and the second light pattern, the first light pattern and the second light pattern, which have mutually different wavelength components, may be irradiated simultaneously, and the no. 1 imaging operation and the no. 2 imaging operation may be performed simultaneously.

Figure 4:
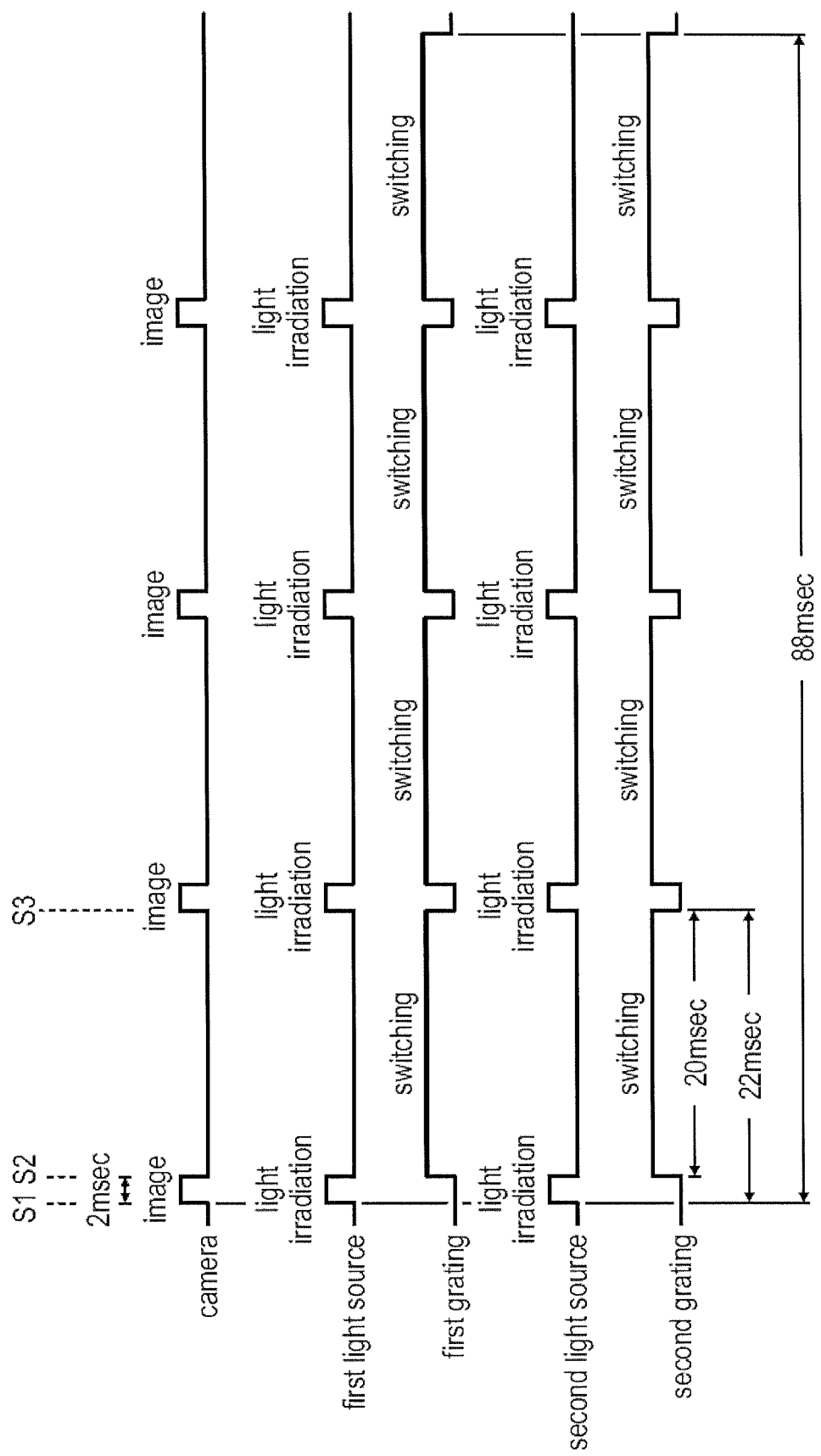
FIG. 4 is a timing chart for explanation of an operating process of a camera and irradiation device according to an another embodiment of the present invention.

Here, the processing procedure executed using this configuration will be described in further detail while referring to the timing chart of FIG. 4. The aforementioned camera capable of imaging separately for each of the light components is exemplified by a CCD color camera equipped with an imaging part and multiple dichroic mirrors corresponding to each of the wavelength ranges, a single-sensor type color camera having each pixel capable of imaging different wavelength regions, or the like.

When the initial setting of the first grating and the second grating is completed, the control device 6 firstly simultaneously starts the no. 1 imaging operation and no. 2 imaging operation (time S1).

Then, when a certain time interval of 2 msec has passed, the control device 6 simultaneously stops the no. 1 imaging operation and no. 2 imaging operation (time S2).

Thereafter, simultaneous with the completion of both imaging operations (time S2), the control device 6 starts switching operation of the liquid crystal shutters 4Ab and 4Bb of the irradiation devices 4A and 4B. Then, after a certain time interval of 20 msec has passed, the control device stops this switching operation (time S3).

Moreover, simultaneous (time S3) with the completion of this switching operation, the control device 6 starts the second no. 1 imaging operation and no. 2 imaging operation. Thereafter, processing similar to that of the aforementioned times S1 to S3 is repeated multiple times.

In this manner, the time required by the present embodiment until completion of all processing relating to a certain inspection area may becomes a total of 88 msec (equal to (time required for the no. 1 imaging operation and no. 2 imaging operation (2 msec)+time required for switching of the first grating and second grating (20 msec))×4).

Measurement time may be further reduced in comparison to the aforementioned embodiment.

(e) Although the imaging operation of the camera 5 according to the aforementioned embodiment was described only as "imaging," more specifically, such imaging operation is classified as the exposure processing that occurs during the actual imaging, and the transfer processing of the imaged data.

Figure 5A:
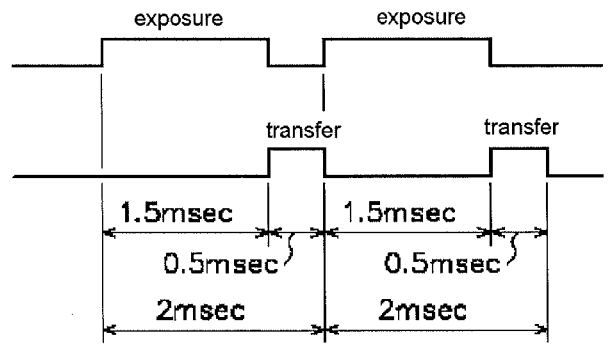
FIGS. 5(a)-5(c) are timing charts for explanation of an operating process relating to camera exposure and data transfer according to one or more embodiments of the present invention.

Therefore, when a general CCD camera or the like is used as the camera 5, due to the inability to send data during the exposure, when the no. 1 imaging operation and no. 2 imaging operation are performed sequentially as in the aforementioned embodiment; the exposure processing and the data transfer processing become alternatingly repeated as per the example shown in FIG. 5(a).

In contrast, when a CMOS camera or a CCD camera or the like having a function capable of exposure during data transfer is used, it is possible to overlap part of the exposure processing and data transfer processing. Therefore, it is possible to reduce the imaging time and, thus, the measurement time.

Figure 5B:
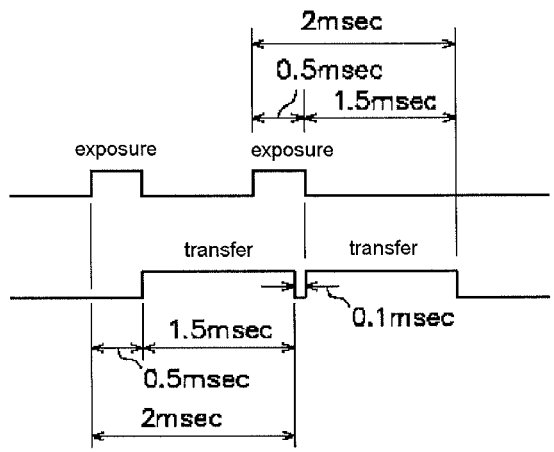

Specifically, when the exposure time is set shorter than the data transfer time, as per the example shown in FIG. 5(b), during the first transfer of data acquired by the first exposure, if the second exposure is started at a time when the second exposure barely remains unfinished, then, while preventing loss of the data that were acquired by the first exposure, it is possible to shorten as much as possible the imaging time interval required for the no. 1 imaging operation and no. 2 imaging operation.

Figure 5C:
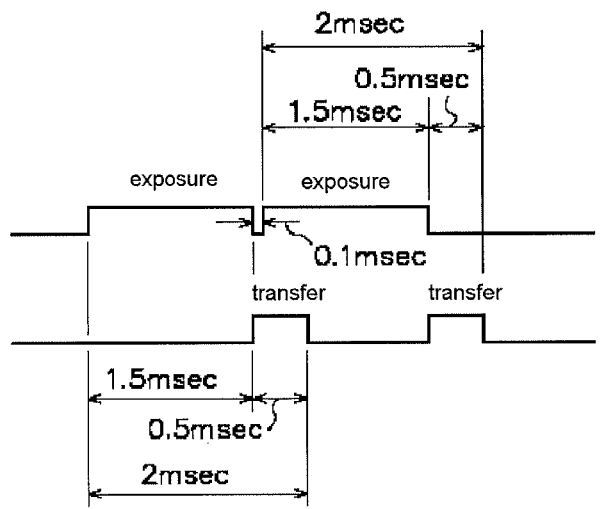
Figure 6:
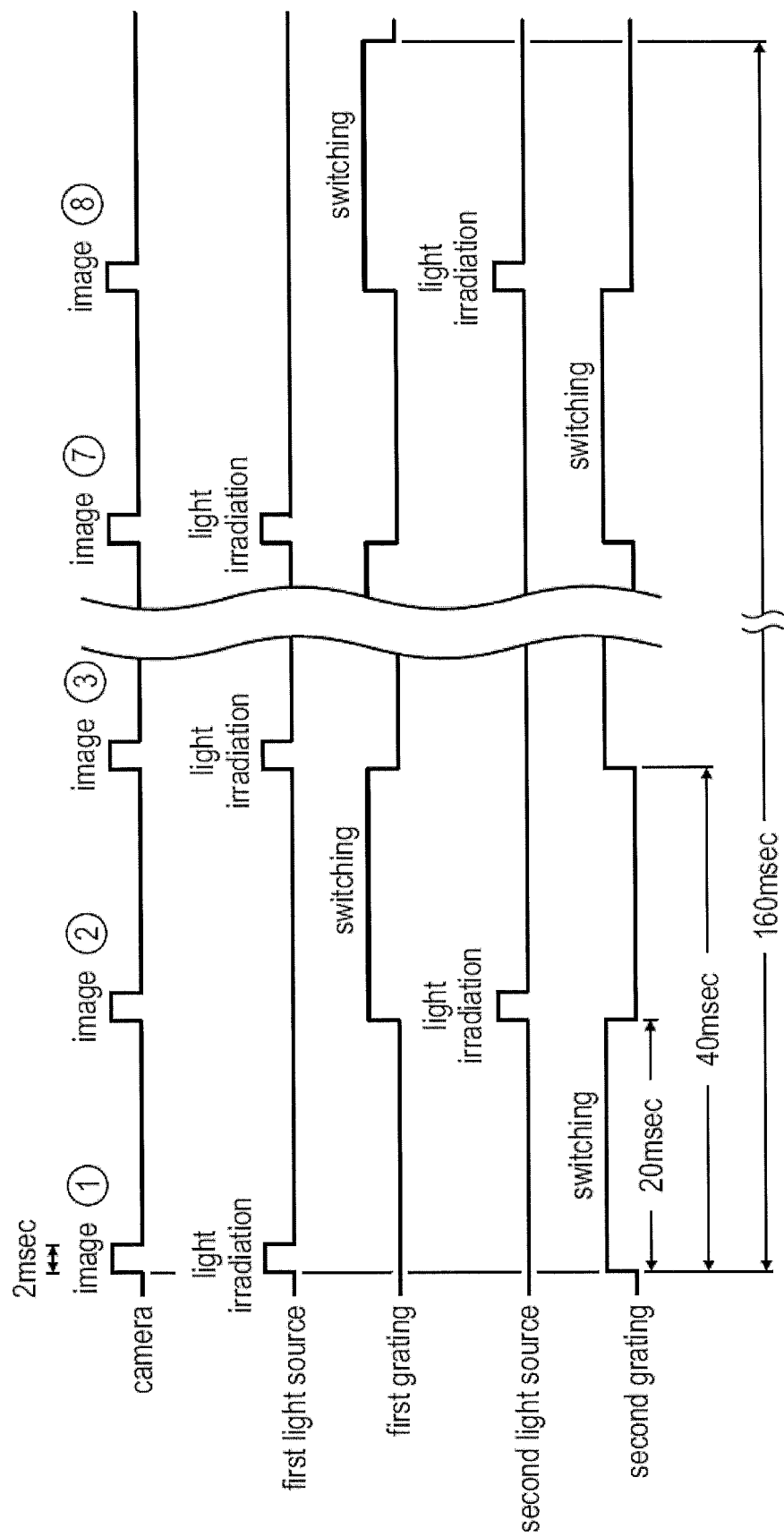
FIG. 6 is a timing chart for explanation of the operating process of a conventional camera and irradiation device.

On the other hand, if the exposure time interval is set longer than the data transfer time, then, as per the example shown in FIG. 5(c), if the second exposure is started immediately after completion of the first exposure, it is possible to shorten as much as possible the imaging time interval required for the no. 1 imaging operation and no. 2 imaging operation.

(f) Although the aforementioned embodiment resulted in a configuration that starting the no. 2 imaging operation simultaneously with finishing of the no. 1 imaging operation, this timing is not limiting. For example, a configuration may be adopted where, after completion of the no. 1 imaging operation, the no. 2 imaging operation is started after a certain time interval (e.g., 1 msec) has passed.

Similarly, according to the aforementioned embodiment, a configuration resulted that started the switching operation of both liquid crystal shutters 4Ab and 4Bb simultaneously with completion of the no. 2 imaging operation. However, this configuration is not limiting, and for example, a configuration may be adopted where the switching operation of both liquid crystal shutters 4Ab and 4Bb starts after a certain time interval has passed (e.g., 1 msec) after the completion of the no. 2 imaging operation.

(g) According to the aforementioned embodiment, although nothing in particular was said about the pitch (stripe pitch) of each light pattern, a configuration may be adopted where the pitch of each light pattern is different. For example, a light pattern of a first pitch (e.g., 600 μm) may be adopted for the first light pattern, and a light pattern of a second pitch (e.g., 800 μm) longer than the aforementioned first pitch may be adopted for the second pattern. If measurement is carried out in this manner by combining a first light pattern having a short pitch with a second light pattern having a long pitch, it is possible to obtain two effects, i.e., increasing the height of the range capable of measurement (i.e., an advantage of use of the second light pattern having a long pitch), and realizing highly precise measurement (i.e., an advantage of the use of the first light pattern having a short pitch). As a result, it is possible to perform measurement at high resolution over a wide dynamic range, and measurement of increased precision can be realized.

Here, the present invention is not limited to a single type of pitch from a single direction, but rather a configuration may be adopted where irradiation uses the same type of light pattern (i.e., same pitch) from multiple directions. For example, a first irradiation device 4A and a second irradiation device 4B may be opposingly disposed as in the aforementioned embodiment, and a configuration may be adopted that provides two such pairs of devices so that 4 irradiation devices 4A and 4B are disposed at 90° intervals centered on the printed board 2.

However, using this configuration, a region may arise where either the first light pattern or the second light pattern is not irradiated.

In contrast, for example, a configuration may be used in which a pair of the first irradiation devices 4A and a pair of the second irradiation devices 4B are provided, the first irradiation device 4A and the second irradiation device 4B being alternatingly disposed with a 90° gap therebetween with the printed board 2 at the center (i.e., the two first irradiation devices 4A are opposingly deposed, and the two second irradiation devices 4B are opposingly deposed).

Due to this configuration, the proportion of a region where either the first light pattern or the second light pattern is not irradiated can be decreased as much as possible. As a result, it is possible to perform measurement of higher accuracy.

(h) According to the aforementioned embodiment, each of the light patterns was irradiated along the x-axis direction parallel to a pair of sides of the rectangular shaped printed board 2. That is, the resultant configuration irradiated the lines of the light pattern orthogonally relative to the x-axis direction, i.e., parallel to the y-axis direction. This configuration is not limiting, and for example, a configuration may be adopted that irradiates the light patterns such that the stripes of the light pattern intersect with each side of the rectangular printed board 2 or the camera 5 visual field (inspection area) at a tilted angle (e.g., 45° as seen in planar view).

(i) According to the aforementioned embodiment, in a planar view (x-y plane) as viewed in roughly the vertical direction (i.e., the imaging direction of the camera 5), the irradiation devices 4A and 4B are opposingly positioned so as to sandwich the printed board 2 therebetween and are positioned at equal distances in the planar view from the central printed board 2. However, this configuration is not limiting, and the placement of the irradiation devices 4A and 4B may be set arbitrarily according to configuration of the printed board 2 or the like so that there is no occurrence of shadowed parts that are non-irradiated by both of the light patterns.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE CHARACTERS

1 ... board inspection apparatus
2 ... printed board
4A ... first irradiation device
4Aa ... first light source
4Ab ... first liquid crystal shutter
4B ... second irradiation device
4Ba ... second light source
4Bb ... second liquid crystal shutter
5 ... camera
6 ... control device

What is claimed is:

1. A device for measuring three dimensional shape, the device comprising:
    a first irradiation unit having a first light source for generation of a certain light, and a first grating for transforming light from said first light source into a first light pattern having a stripe-like light intensity distribution, so that the first irradiation unit is capable of irradiating said first light pattern from a first position upon an object to be measured;
    a first grating control unit configured to control shifting or switching of said first grating and causing multiple changes of phase of said first light pattern irradiated from said first irradiation unit;
    a second irradiation unit having a second light source for generation of a certain light, and a second grating for transforming light from said second light source into a second light pattern having a stripe-like light intensity distribution, so that the second irradiation unit is capable of irradiating said second light pattern from a second position different from said first position upon the object to be measured;
    a second grating control unit configured to control shifting or switching of said second grating and causing multiple changes of phase of said second light pattern irradiated from said second irradiation unit;
    an imaging unit configured to image reflected light from said object to be measured irradiated by said first light pattern and said second light pattern;
    and an image processing unit configured to perform three dimensional measurement by phase shift method based on multiple acquired sets of image data based on irradiation of said first light pattern and said second light pattern of multiply varied phases;
    wherein, after performance of a first imaging operation as imaging processing of a single operation among a multiplicity of imaging operations performed by irradiation of said first light pattern of multiply varied phases, a second imaging operation is performed as imaging processing of a single operation among a multiplicity of imaging operations performed by irradiation of said second light pattern of multiply varied phases;
    and after completion of said first imaging operation and said second imaging operation, shifting or switching operation of said first grating and said second grating is performed simultaneously.

2. A device for measuring three dimensional shape, the device comprising:
    a first irradiation unit having a first light source for generation of a light having a first wavelength component, and a first grating for transforming light from said first light source into a first light pattern having a stripe-like light intensity distribution, so that the first irradiation unit is capable of irradiating said first light pattern from a first position upon an object to be measured;
    a first grating control unit configured to control shifting or switching of said first grating and causing multiple changes of phase of said first light pattern irradiated from said first irradiation unit;
    a second irradiation unit having a second light source for generation of a light having a second wavelength component differing from said first wavelength component, and a second grating for transforming light from said second light source into a second light pattern having a stripe-like light intensity distribution, so that the second irradiation unit is capable of irradiating said second light pattern from a second position, differing from said first position, upon the object to be measured;
    a second grating control unit configured to control shifting or switching of said second grating and causing multiple changes of phase of said second light pattern irradiated from said second irradiation unit;
    an imaging unit configured to image separately, for each light component, reflected light from said object to be measured irradiated by said first light pattern and said second light pattern;
    and an image processing unit configured to perform three dimensional measurement by phase shift method based on multiple acquired sets of image data based on irradiation of said first light pattern and said second light pattern of multiply varied phases;
    wherein, simultaneous with performance of a first imaging operation as imaging processing of a single operation among a multiplicity of imaging operations performed by irradiation of said first light pattern of multiply varied phases, a second imaging operation is performed as imaging processing of a single operation among a multiplicity of imaging operations performed by irradiation of said second light pattern of multiply varied phases;
    and after completion of said first imaging operation and said second imaging operation, shifting or switching operation of said first grating and said second grating is performed simultaneously.

3. The device for measuring three dimensional shape according to claim 1,
wherein positional relationship between said imaging unit and said object to be measured is fixed at least during performance of each said imaging operation.

4. The device for measuring three dimensional shape according to claim 2,
wherein positional relationship between said imaging unit and said object to be measured is fixed at least during performance of each said imaging operation.

5. The device for measuring three dimensional shape according to claim 1,
wherein said first light pattern is produced as a light pattern of a first period,
and said second light pattern is produced as a light pattern of a second period different from said first period.

6. The device for measuring three dimensional shape according to claim 2,
wherein said first light pattern is produced as a light pattern of a first period,
and said second light pattern is produced as a light pattern of a second period different from said first period.

7. The device for measuring three dimensional shape according to claim 3,
wherein said first light pattern is produced as a light pattern of a first period,
and said second light pattern is produced as a light pattern of a second period different from said first period.

8. The device for measuring three dimensional shape according to claim 4,
wherein said first light pattern is produced as a light pattern of a first period,
and said second light pattern is produced as a light pattern of a second period different from said first period.

* * * * *